Oct. 18, 1927. 1,645,632
E. H. TURNELL
MILK BOTTLE AND CREAM SEPARATOR FOR USE THEREWITH
Filed Oct. 22, 1925
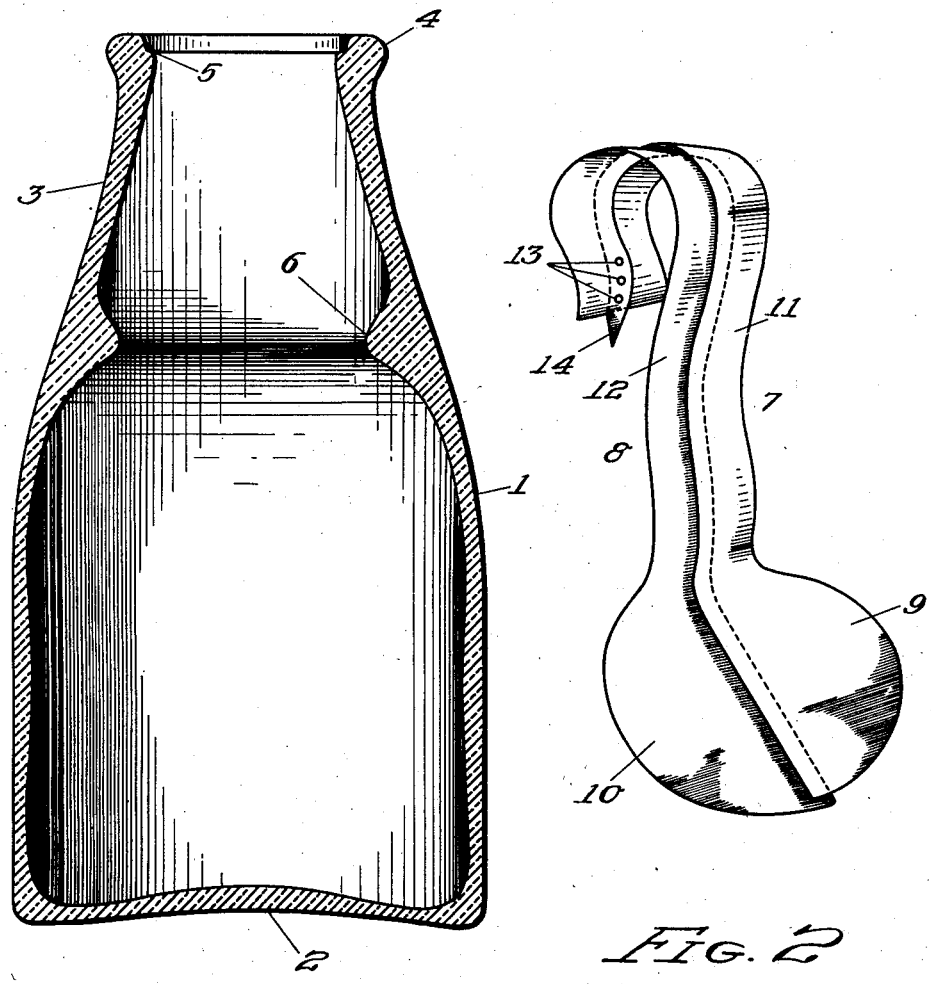

Patented Oct. 18, 1927.

1,645,632

UNITED STATES PATENT OFFICE.

ERNEST H. TURNELL, OF CHICAGO, ILLINOIS.

MILK BOTTLE AND CREAM SEPARATOR FOR USE THEREWITH.

Application filed October 22, 1925. Serial No. 64,196.

This invention relates to improvements in milk bottles and cream separators for use therewith. More specifically the invention consists in the combination and arrangement of parts to be hereinafter fully described, pointed out in the appended claims and illustrated in the accompanying drawing which forms a part of this application and in which—

Fig. 1 is a vertical sectional view through the milk bottle.

Fig. 2 is a perspective view of the cream separator designed for use in connection with said bottle.

The bottle comprises the body 1 having the base 2, the upper end of the body being tapered as at 3 and terminating in the flared mouth 4 formed with the inner cap-receiving ledge or shoulder 5. Within the body at the lower end of its tapered or upper portion an annular shoulder or seat 6 is formed which is of slightly greater diameter than the diameter of the bottle mouth at the ledge 5. That portion of the bottle body above the seat 6 is the cream chamber and the body portion below the said ledge is the skim milk chamber, the capacity of the latter being about five times that of the cream chamber.

The separator comprises a spring metal insert comprising the right and left hand sections 7, 8 which when assembled overlap each other, each section terminating at one end in a lobe or flared portion 9 or 10, the lobe 9 merging into the ribbon-like portion 11 and the lobe 10 into a ribbon-like portion 12, said ribbon like portions being connected together by several rivets 13 at one end and a tip 14 being formed upon the portion 12 and projected beyond the termination of the portion 11.

The insert is passed into the mouth of the bottle and the lobes 9, 10 disposed upon the annular seat 6, the ribbon-like portions of the insert being of such a length relative to the bottle that they will then extend from said seat to the ledge 5, the tip 14 projecting beyond said ledge. The ordinary bottle cap may now be disposed upon the ledge 5, the tip 14 passing between said cap and the ledge.

Cream will form in the cream chamber and when the cap has been removed, it having been dislodged by a slight upward pull upon the tip 14, the cream may readily be poured off, by tipping the bottle, without pouring the milk. As the insert sections are riveted together at one end only they may be readily inserted into or removed from the bottle for cleaning etc. To introduce the insert into the bottle the lobes 9 and 10 are manually pressed together to permit them to pass through the bottle mouth. Within the bottle they expand to normal position and are disposed upon the shoulder 6 and there form a wall above which the cream may be poured off. This feature of the insert makes it adjustable for use with bottles that vary somewhat in size and proportion.

What is claimed is:—

1. A separator for use in a milk bottle having a milk chamber and a cream chamber separated therefrom by an annular shoulder, said separator comprising a right hand section of ribbon-like formation throughout the greater portion of its extent but terminating at one end in a lobe portion, a left hand section of like formation, said sections overlapping each other in assembly, and fastening means for said sections at one of their ends.

2. A separator for use in milk bottles having milk and cream chambers separated by annular shoulders, said separator comprising separate substantially twin members, the lower ends of said members being substantially enlarged and adapted yieldingly to coincide one with the other, and fastening means connecting the upper ends of said members together.

3. A separator for use in milk bottles having milk and cream chambers separated by annular shoulders, said separator comprising substantially twin members overlapped in assembly, and fastening means for the upper ends of said members, the lower ends of said members being substantially enlarged and capable yieldingly of coinciding one with the other.

ERNEST H. TURNELL.